(12) United States Patent
Sama

(10) Patent No.: US 8,572,684 B1
(45) Date of Patent: Oct. 29, 2013

(54) AUTHENTICATION USING ONE-TIME PASSWORDS AND ASSOCIATED INDICIA FOR PLURAL SEQUENCES

(75) Inventor: Venkata Babji Sama, Bangalore (IN)

(73) Assignee: CA, Inc., Islandia, NY (US)

( * ) Notice: Subject to any disclaimer, the term of this patent is extended or adjusted under 35 U.S.C. 154(b) by 8 days.

(21) Appl. No.: 13/344,943

(22) Filed: Jan. 6, 2012

Related U.S. Application Data

(60) Provisional application No. 61/430,807, filed on Jan. 7, 2011.

(51) Int. Cl.
*H04L 9/32* (2006.01)

(52) U.S. Cl.
USPC ........................................ 726/2; 726/3; 726/4

(58) Field of Classification Search
USPC ................ 726/2–10; 713/150, 155, 168–172, 713/182–186; 380/44
See application file for complete search history.

(56) References Cited

U.S. PATENT DOCUMENTS

| 7,409,705 B2 * | 8/2008 | Ueda et al. ......................... 726/5 |
| 8,181,234 B2 * | 5/2012 | Ishida ................................ 726/7 |
| 2009/0222656 A1 * | 9/2009 | Rouskov et al. ............... 713/155 |

* cited by examiner

*Primary Examiner* — Hosuk Song
(74) *Attorney, Agent, or Firm* — Vierra Magen Marcus LLP

(57) ABSTRACT

Methods, apparatus, and systems for using multiple one-time passwords (OTPs) to authenticate a user to access goods or services provided by a single service provider. An electronic computing device associated with the user may include multiple OTP generators for generating multiple OTPs, where each OTP is associated with an OTP identifier that uniquely identifies the OTP from other OTPs. The electronic computing device sends OTP information including the generated OTP and OTP identifier to an authentication server which determines whether a stored OTP corresponding to the received OTP identifier matches the received OTP and, if there is a match, authenticates the user to access goods or services from a single service provider.

25 Claims, 12 Drawing Sheets

AUTHENTICATION USING ONE-TIME PASSWORDS AND ASSOCIATED INDICIA FOR PLURAL SEQUENCES

CROSS-REFERENCES TO RELATED APPLICATIONS

This application claims benefit under 35 U.S.C. 119(e) of U.S. Provisional Patent Application No. 61/430,807 filed on Jan. 7, 2011, which is herein incorporated by reference in its entirety for all purposes.

BACKGROUND

1. Field of the Invention

Embodiments of the present invention generally relate to authentication of users of computing devices. More particularly, the present invention relates to authentication using one-time passwords (OTPs) where multiple OTPs (or OTP Tokens) are issued to a user from a single service provider.

2. Description of the Related Art

Recently, the rapid rise of network threats has exposed the inadequacies of static passwords as the primary form of authentication over the Internet. As an alternative, OTPs are emerging as a popular form of authentication for securing network access.

OTPs avoid a number of shortcomings that are associated with traditional (static) passwords. Most importantly, the OTPs are not vulnerable to replay attacks. On the downside, OTPs cannot be memorized by human beings. There are different ways to make the user aware of the next OTP to use. Some systems use special electronic tokens (e.g., a key fob) that the user carries and that generates OTPs and displays them to the user on a small display. Other systems consist of software that runs on the user's mobile telephone, computer, PDA, or other computing device that generates and displays the OTPs to the user. Still other systems generate OTPs on the server-side and send the OTPs to the requesting user using an out-of-band channel, such as SMS messaging. An application accesses the OTPs received out-of-band and presents or displays them to the user. Finally, in some systems, OTPs are printed on paper that the user is required to carry with him or her. Regardless of the approach used, the term "token" as used herein indicates the user-side component that generates, displays, and/or presents the OTPs to the user, irrespective of whether the component is implemented in hardware, software, or a combination of hardware and software.

OTP technology relies on coordination or synchronization between the device generating the OTP for the user and the server that is verifying the OTP. Typically, in cases where the OTP is being generated at the user side (e.g., on or using the token) and the server side independently, the coordination consists of a secret and a current counter value. The counter value is what changes each time a new OTP is generated. The OTP is generated in a cryptographically secure manner using both the secret and the counter value.

The passwords themselves may be generated in one of two ways: either as time-synchronized passwords or counter-synchronized passwords. Time-synchronized OTPs use the current time to derive the counter and are subject to problems caused by clock skew. That is, if the authentication server and the user token don't keep the same time, then the expected OTP value won't be produced and the user authentication will fail. So, this technique requires a reliable time source at the user end which is difficult in the case of software implementations running on hand-held devices or computers that are not time-synced accurately. A counter-synchronized OTP solution synchronizes a counter between the electronic computing device and the server. Each time an OTP is generated, the token increments the internal counter value by one. On the server, for each successful authentication, the server also increments its counter value by one. In this way, the token's and the server's counter values stay synchronized in lock step and will typically generate the same one-time password. Counter based tokens may get out of sync if the token is asked to generate several OTPs that are never actually used in authentication attempts. Then the token's counter value is increased while the server's counter value is not increased, leading to a synchronization problem. When a synchronization problem occurs, a token-generated OTP may fail an authentication attempt because the server doesn't recognize the token-generated OTP.

Regardless of how passwords are generated, OTPs today are deficient in that they are typically suitable only for use in scenarios where an issuer (such as a bank) issues a single OTP to a user, and the user may then use that single OTP to access goods or services provided by that issuer. In some cases, a user may have multiple OTPs, but each OTP is only operable to access goods or services provided by one service provider. None of the known techniques for generating OTPs consider situations where an issuer desires to issue multiple OTPs to a single user for accessing goods or services from a single service provider, nor do they consider the problems that arise in such situations or potential solutions for addressing such problems.

BRIEF SUMMARY

Embodiments of the present invention generally relate to authentication of users of computing devices and, more particularly, to authentication using one-time passwords (OTPs) where multiple OTPs are issued to a user for accessing goods or services from a single service provider. In accordance with various embodiments, methods for authenticating a user of an electronic computing device using a one-time password are disclosed. The methods may include generating, at the electronic computing device, one of a plurality of OTPs associated with the user and operable to authenticate the user to access goods or services provided by a single service provider. The methods may also include sending OTP information including the generated OTP and an OTP identifier to an authentication server that is associated with the service provider, the OTP identifier uniquely identifying the generated OTP from other OTPs of the plurality of OTPs. In some cases, the methods may also include receiving an authentication response from the authentication server, the authentication response being based on an authentication of the user using both the generated OTP and the OTP identifier and indicating whether the user is authenticated to access the goods or services provided by the service provider.

In accordance with some embodiments, devices for authenticating a user using a one-time password are disclosed. The devices may include a one-time password generator configured to generate one of a plurality of OTPs, the OTPs being associated with the user and operable to authenticate the user to access goods or services provided by a single service provider. In some embodiments, the devices may also include a communication interface coupled to the one-time password generator, the communication interface being configured to send OTP information including the generated OTP and an OTP identifier to an authentication server that is associated with the service provider, the OTP identifier uniquely identifying the generated OTP from other OTPs of the plurality of OTPs.

In accordance with some embodiments, methods for authenticating a user of a electronic computing device using a one-time password are disclosed. The methods may include receiving, at an authentication server, OTP information including an OTP and an OTP identifier, both the OTP and the OTP being associated with a user. In some embodiments, the methods further include identifying an OTP associated with the received OTP identifier, the identified OTP being one of a plurality of OTPs assigned to the user, the plurality of OTPs being operable to authenticate the user to access goods or services provided by a single service provider associated with the authentication server. The methods may also include determining whether the identified OTP matches the received OTP, and authenticating the user based on whether or not the identified OTP matches the received OTP.

In accordance with some embodiments, authentication servers for authenticating a user of a electronic computing device using a one-time password are disclosed. The authentication servers may include a communication interface operable to receive OTP information including an OTP and an OTP identifier, both the OTP and the OTP identifier being associated with a user. In some embodiments, the authentication servers may also include a processor coupled to the communication interface, the processor being operable to: identify a plurality of stored OTP identifiers assigned to the user, each OTP identifier being associated with an OTP, the plurality of OTPs being operable to authenticate the user to access goods or services provided by a single service provider associated with the authentication server; determine whether the received OTP identifier matches any of the identified OTP identifiers assigned to the user; if the received OTP identifier matches one of the identified OTP identifiers assigned to the user, identify the OTP associated with the matched one of the identified OTP identifiers; determine whether the identified OTP matches the received OTP; and authenticate the user based on whether or not the identified OTP matches the received OTP.

Additional embodiments and features are set forth within the description that follows, and in part will become apparent to those skilled in the art upon examination of the specification, or may be learned by the practice of the disclosed embodiments. The features and advantages of the disclosed technology may be realized and attained by means of the instrumentalities, combinations, and methods described in the specification.

BRIEF DESCRIPTION OF THE DRAWINGS

A further understanding of the nature and advantages of the disclosed embodiments may be realized by reference to the remaining portions of the specification and the drawings.

DETAILED DESCRIPTION

Figure 1:
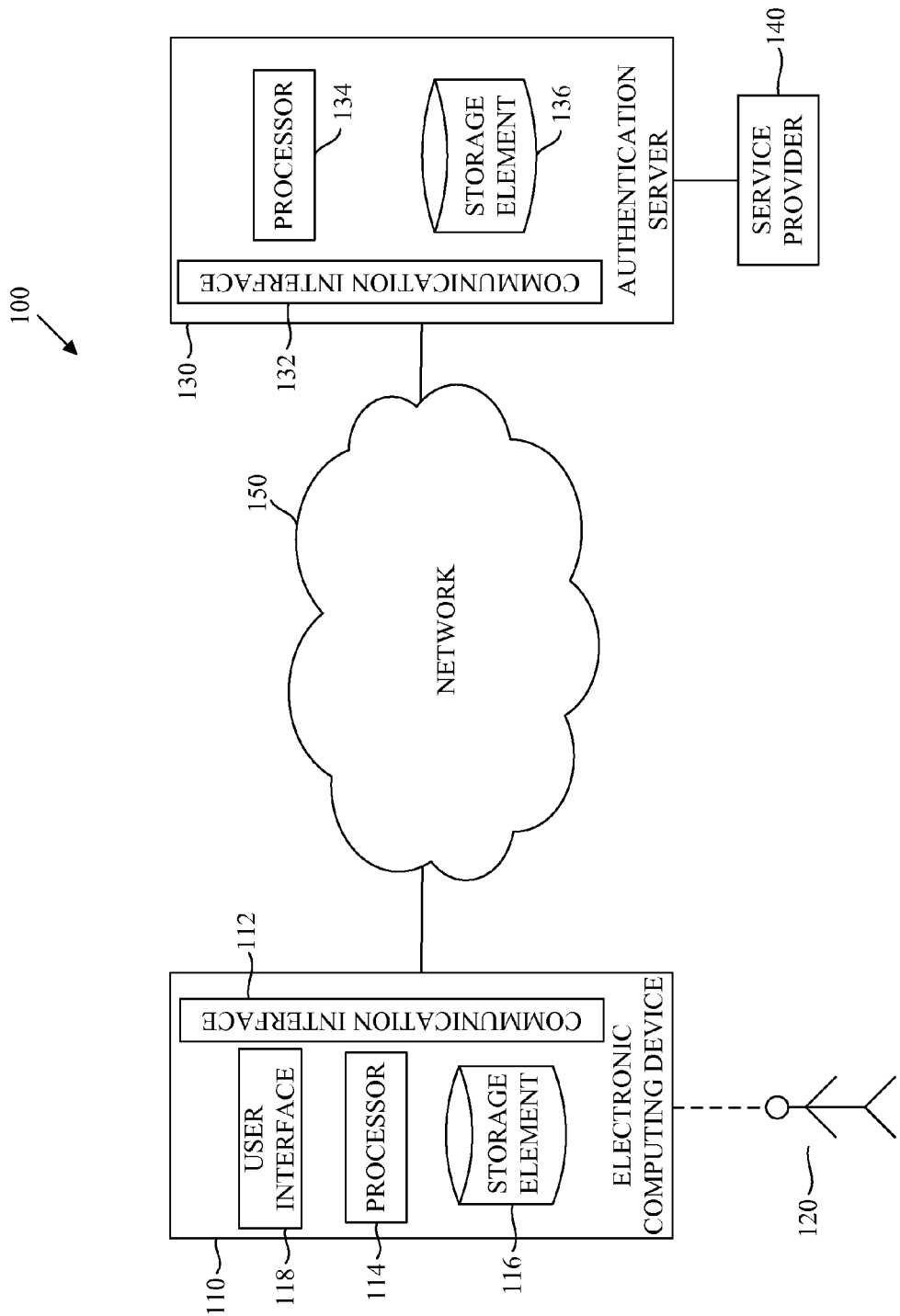
FIG. 1 shows a simplified system illustrating an environment operable to implement aspects of one or more of the embodiments disclosed herein.

Systems, methods and apparatus for supporting one-time passwords (OTPs) are provided herein where a user is issued multiple different OTPs for accessing goods or services provided by a single service provider. There are various scenarios in which a service provider may wish to issue multiple OTPs to a single user. For example, the use of multiple OTP tokens provides a solution for service providers, such as online gaming providers or Software as a Service (SaaS) vendors who have several applications they want to secure using different OTPs for the different applications. There is another scenario where an issuer issues multiple OTPs for a single account. This is a likely case where software-generated OTPs are being used. For example, a user may want to generate the OTP from multiple devices (e.g., one device at home and another device at the office, or on a personal mobile telephone as well as on a business mobile telephone). The same OTP cannot be used across devices because they go out of sync, so instead the user can be issued multiple different OTPs on different devices, all of which enable access to the single account. In another scenario a single user has multiple accounts (e.g., a checking account and a savings account) with the same issuer, each of which would require a different OTP. In yet another scenario, there is a single issuer and single or multiple accounts, but some of the OTPs are re-issued. This is the case where it would be desired to detect a revoked/reissued credential if any during an authentication attempt and handle the revoked/reissued credential gracefully. In another scenario, a user may request a temporary OTP for short term usage, such as when the user is travelling or authenticating from an un-trusted computer. Such scenarios pose a new set of challenges with regard to keeping the counter values and/or time values in sync between the server and the token. For example, in the case of a counter-based OTP where multiple devices are used to access a single account, a single token cannot be used reliably across devices because the counters will go out of sync. In the case of a time-based OTP, the server would have difficulty keeping itself in sync with multiple time sources.

To address some or all of these challenges, a user may be issued multiple different OTPs. Each OTP may maintain its own counter which reduces the synchronization issue to the case of a single OTP scenario. An identifier may be sent along with the OTP in some embodiments so that the service provider can detect the instance of the OTP being used during the verification. The identifier may be used by the authentication server to identify which OTP of the user's multiple OTPs is being used for authentication. The identifier may include a single digit, character, or other symbol. The OTP identifier may be sent with the OTP in a number of different ways. For example, the OTP identifier may be concatenated with the OTP, inserted within the OTP, or applied as a bitmask to the OTP. A user device sends the identifier and OTP to an authentication server, and the authentication server deterministically verifies the OTP using the identifier and the received OTP. In some embodiments, an authentication response may be received from the authentication server, the authenticating response being based on an authentication of the user using both the OTP and the OTP identifier.

In various embodiments including those discussed above, a user device sends an identifier (along with an OTP) which may distinguish the current OTP over other OTPs issued to the user device (or user associated with the device) so that the authenticating party can verify the current OTP. This approach eliminates the burden on the user in the case where the user device decides which OTP to use for authentication. But in situations where the user selects the OTP from a number of OTPs provided by the user device, the user may also indicate which of the user's multiple OTPs is being used. For example, if a user has two different OTPs from a bank (OTP-1 and OTP-2), the user might attempt to login using OTP-1. The user may input the generated OTP-1, and the authentication server would verify it by matching it with an appropriate OTP. In this case, the user also indicates which OTP of the user's two different OTPs (OTP-1 or OTP-2) is being used (e.g., by entering additional information about the OTP instance). Otherwise, if the user does not indicate which OTP is being used, the authentication server may have to match the inputted OTP against all possible OTPs (e.g., all the OTPs that are issued to the user and optionally for this account). Matching against all possible OTPs may not be desirable in certain situations. For example, in cases where a generated OTP is incorrect (e.g., the second factor used to unlock the OTP token was incorrect), applying authentication policies like incrementing a strike count or locking the credential would require knowing the exact OTP being used instead of applying the policy against all the OTPs assigned to the user. In some embodiments, the user may not be required to explicitly type in an OTP identifier while the authentication server would still be able to verify the OTP deterministically.

Among the multiple OTPs that a user has, each one may be assigned a unique short identifier (e.g., a single letter from {0 ... 9, a ... z, A ... Z}) which would distinguish it from others. This identifier may be stored along with the OTP parameters on the authentication server as well as on the user device that is operable to generate the OTPs. Now the user device may generate the OTP and concatenate the identifier (e.g., [ID][OTP] or [OTP][ID]) and show to it to the user. The concatenated identifier/OTP is read by the user who may then submit the concatenated identifier/OTP to the authentication server. The authentication server, after receiving the concatenated identifier/OTP, may parse or split the received string into the identifier and the OTP. The identifier may then be used to identify the corresponding OTP and hence the authentication server can deterministically verify the OTP.

The technique of concatenating an identifier to an OTP may be completely transparent to the user. Also, in some embodiment, the identifier may be kept short (e.g., one character/digit in some embodiments), which would advantageously not increase the OTP length significantly.

In some embodiments, in addition to concatenating an identifier to an OTP, a checksum may also be added (e.g., appended) to the OTP. The checksum may be used to detect errors in the OTP such as typographical errors or other errors resulting from incorrectly reading an OTP (e.g., errors that may arise when optically reading an OTP using an optical reader such as a camera). The checksum may then advantageously assist in identifying the OTP precisely using the OTP identifier discussed herein.

According to some embodiments, the techniques described herein may be applied to various OTP technologies, such as OATH and/or EMV. Generally, these techniques may advantageously aid in resolving ambiguity in any mechanism where a password is generated and a server needs to verify the generated password against multiple valid passwords associated with a single user or device.

In embodiments where an OTP is generated on the user side, the OTP identifier may be exchanged between the user and the authentication server as an attribute in a string of OTP parameters, so that the server can automatically determine the identifier for an OTP at the time of issuing the token, and the client would use the same identifier while generating the OTP using the token. This approach may be more generic and may cover wide ranges of passwords including implementations for OATH and EMV as well. For example, a user may be associated with multiple devices. Each device may be associated with a token used to generate OTPs used, for example, for authentication. A table may be stored at an authentication server that authenticates a user of one or more of the devices, where the OTP elements of the table may be static or dynamically generated (e.g., generated in response to each authentication request received from a user). The table may include a column that identifies multiple OTPs associated with a given user, another column that includes the identifier associated with each OTP, and another column that includes a string of OTP parameters. Similarly, in a case where an authentication server generates multiple OTPs or passwords for a user where all of the OTPs/passwords are active, the identifier may be included in the generated password. There can be multiple possibilities for embedding this identifier into the generated password. As discussed above, in some embodiments, the identifier may be concatenated in a fixed position to the beginning or end of the password. Alternatively, the identifier may be embedded at various positions within the OTP. The precise position or positions may be decided at the time of issuance of the credential. In some embodiments, the identifier may be applied as a bit mask spanning throughout the OTP so that it is invisible to the user and advantageously keeps the size of the OTP unchanged.

Turning now to the figures, FIG. 1 shows a simplified system 100 illustrating an environment operable to implement aspects of one or more of the embodiments disclosed herein. System 100 includes an electronic computing device 110 associated with a user 120, and an authentication server 130 associated with a service provider 140, all interconnected via a network 150.

Electronic computing device 110 may be any suitable electronic computing device, such as a mobile phone, a personal digital assistant (PDA), a handheld or portable device (iPhone™, Blackberry™, etc.), a notebook, personal computer, note pad or other electronic device configured for wired or wireless communication. In some embodiments, electronic computing device 110 may comprise a physical medium having the OTP stored or otherwise provided thereon, such as a scratch card having the OTP printed thereon, where the printed OTP may be in its original form (e.g., numbers, letters, symbols, or a combination thereof) or in an encoded form (e.g., a barcode). Electronic computing device 110 may be associated with a user 120 having a desire to authenticate themselves in order to obtain access to goods and/or services provided by service provider 140.

Electronic computing device 110 may include any suitable components typically found in such electronic device necessary to perform the operations discussed herein. In one embodiment and as illustrated in FIG. 1, electronic computing device 110 includes a communication interface 112, a processor 114, a tangible non-transitory computer readable storage element 116, and a user interface 118. Communication interface 112 is any suitable interface or interfaces operable to enable communication between electronic computing device 110 and other elements of system 100, such as authentication server 130. Processor 114 is any suitable computing processor or processors operable to execute instructions that cause electronic computing device 110 to perform one or more of the operations discussed herein. For example, processor 114 may execute software code stored in one or more storage elements such as storage element 116. Storage element 116 may be any storage element or storage elements suitable for storing data, software code, and other information used by electronic computing device 110. For example, storage element 116 may include one or more of random access memory (RAM), read only memory (ROM), electrically-erasable programmable read only memory (EEPROM), a hard disk, an optical disk, etc. User interface 118 may include one or more elements for receiving input from a user and providing outputs to the user. For example, user interface 118 may include a keypad, a display, a touch screen, or a combination thereof.

Authentication server 130 may be any suitable electronic computing device or system of electronic computing devices operable to authenticate user 120 such that user 120 may access goods or services from service provider 140. For simplicity, authentication server 130 is shown and discussed as a single computing device, although a person of ordinary skill in the art would recognize that authentication server 130 may be implemented as a plurality of devices and/or storage elements.

Authentication server 130 may include any suitable components typically found in such systems necessary to perform the operations discussed herein. In one embodiment and as illustrated in FIG. 1, authentication server 130 includes a communication interface 132, a processor 134, and a tangible non-transitory computer readable storage element 136. Communication interface 132 is any suitable interface or interfaces operable to enable communication between authentication server 130 and other elements of system 100, such as electronic computing device 110 and/or service provider 140. Processor 134 is any suitable computing processor or processors operable to execute instructions that cause authentication server 130 to perform one or more of the operations discussed herein. For example, processor 134 may execute software code stored in one or more storage elements such as storage element 136. Storage element 136 may be any storage element or storage elements suitable for storing data, software code, and other information used by authentication server 130. For example, storage element 136 may include one or more of random access memory (RAM), read only memory (ROM), electrically-erasable programmable read only memory (EEPROM), a hard disk, an optical disk, etc.

Network 150 is any suitable network for enabling communications between various entities, such as between electronic computing device 110 and authentication server 130, electronic computing device 110 and service provider 140, and/or authentication server 130 and service provider 140. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. Components utilized for such a system may depend at least in part upon the type of network and/or environment selected. Network 150 may utilize any suitable protocol, such as TCP/IP, OSI, FTP, UPnP, NFS, CIFS, and AppleTalk. Communication over the network may be enabled by wired or wireless connections, and combinations thereof.

User 120 may be any suitable person, business, or entity that desires access to goods or services provided by a single service provider such as service provider 140. Service provider 140 may be any suitable person, business, or entity that is operable to provide goods or services to users such as user 120. In some embodiments, service provider 140 may include a variety of electronic components such as those discussed with reference to authentication server 130. For example, service provider 140 may include a communication interface, processor, storage element, etc. (not shown). In some embodiments, service provider 140 may include authentication server 130, such that service provider 140 is operable to perform authentication of user 120 as discussed herein. In other embodiments, service provider 140 may exclude authentication server 130, such that authentication server 130, while operable to authenticate user 130, may provide information to service provider 140 indicating whether or not user 120 is authenticated.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

Figure 2:
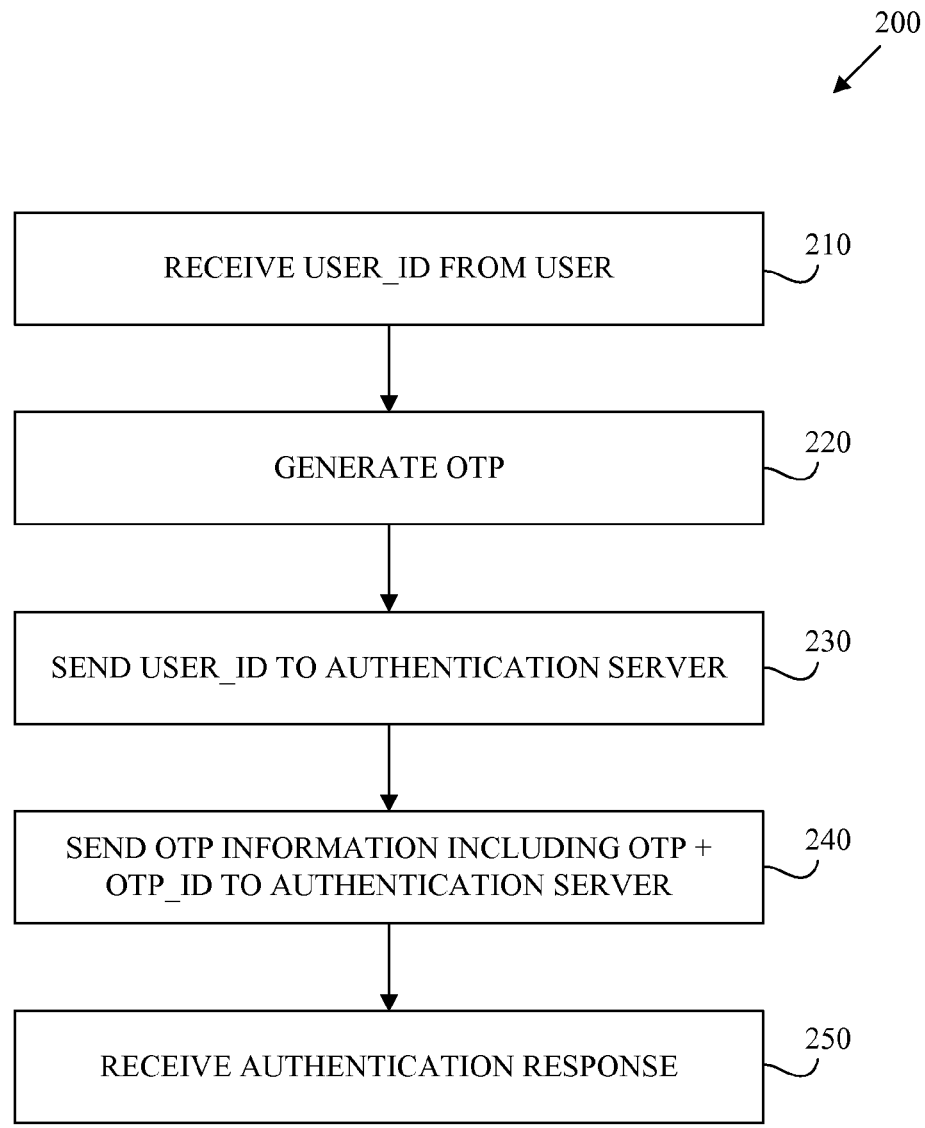
FIG. 2 is a flowchart depicting example operations of an electronic computing device that may be used to authenticate a user associated with the electronic computing device.

FIG. 2 is a flowchart depicting example operations 200 of electronic computing device 110 in accordance with an embodiment. The example operations show one or more steps that may be used to authenticate a user 120 associated with electronic computing device 110.

In operation 210, electronic computing device 110 receives a user identifier (user_id) from user 120. The user identifier may be any suitable information operable to uniquely distinguish user 120 from other users of computing devices. The user identifier may be formed of any suitable numbers, letters, characters, symbols, or combination thereof. For example, the user identifier may be a name of the user 120. The user identifier may be received by electronic computing device 110 in any suitable fashion. For example, user 120 may input the user identifier into electronic computing device 110 via user interface 118. In some embodiments, the user identifier may be stored in storage element 116 of electronic computing device 110.

In operation 220, electronic computing device 110 generates a one-time password. The one-time password may be generated using any suitable OTP generation techniques. In some embodiments, a token or other OTP generator is stored in storage element 116 as application code, and processor 114 may operate to execute that code so as to generate the OTP. In some embodiments, the token or other OTP generator may be provided by service provider 140 and/or authentication server 130, and may be associated with specific goods and/or services provided by service provider 140 and operate to generate OTPs operable to authenticate user 120 to access those select goods and/or services provided by service provider 140. In generating the OTP, the OTP generator may use any suitable techniques and information. For example, the OTP generator may be associated with a counter provided by electronic computing device 110, and use the counter to generate the OTP for synchronization purposes. For another example, the OTP generator may use a clock provided by electronic computing device 110, and use the time provided by the clock to generate the OTP for synchronization purposes. In some embodiments, the OTP generator may also use a password that is shared between user 120 and service provider 140 and/or authentication server 130, or in some cases a password that is known only by user 120.

In operation 230, electronic computing device 110 sends the user identifier to authentication server 130. For example, electronic computing device 110 may send the user identifier to authentication server 130 via network 150, communication interface 112 and communication interface 132. In some embodiments, the user identifier may be communicated to authentication server 130 from an electronic computing device other than electronic computing device 110. This may be another electronic computing device associated with user 120 or, in some embodiments, associated with a another entity such as a merchant.

In operation 240, electronic computing device 110 sends OTP information including the generating OTP and an OTP identifier to authentication server 130. The OTP identifier may be associated with the OTP generator and operate to uniquely identify the OTP generator from other OTP generators either provided by electronic computing device 110 or by other electronic computing devices associated with user 120, where all of the OTP generators may be configured to generate OTPs operable to authenticate user 120 to access goods or services provided by a single service provider such as service provider 140. The OTP identifier may be stored in storage element 116. The OTP identifier may take any suitable form for identifying the OTP generator. That is, the OTP may be any letter, number, character, symbol, or combination thereof. For example, the OTP identifier may be one or more characters selected from the group consisting of {0 . . . 9, a . . . z, A . . . Z}. In some embodiments, the OTP information may be communicated to authentication server 130 from an electronic computing device other than electronic computing device 110. This may be another electronic computing device associated with user 120 or, in some embodiments, associated with a another entity such as a merchant. For example, electronic computing device 110 may first display the generated user identifier on a display such as one provided by user interface 118. Upon reading the displayed OTP, user 120 may then enter the OTP into a different device that is in communication with authentication server 130, or communicate it to a merchant or other entity, which may then operate to communicate the OTP to authentication server 130. The OTP information may be communicated via the same or different channel as the user identifier.

In some embodiments, the OTP identifier may be stored in storage element 116 and associated with a particular OTP generator of electronic computing device 110, where the association is also stored. In this case, electronic computing device 110 may operate to read the OTP identifier from storage element 116 and automatically communicate it with its associated OTP to authentication server 130. In other embodiments, user 120 may enter the OTP identifier into electronic computing device 110, for example by using user interface 118. In this case, electronic computing device 110 need not store the relationship between the OTP generator and the associated OTP identifier, and the communicated OTP information may include the OTP generated by electronic computing device 110 and the OTP identifier input by user 120.

Figure 3:
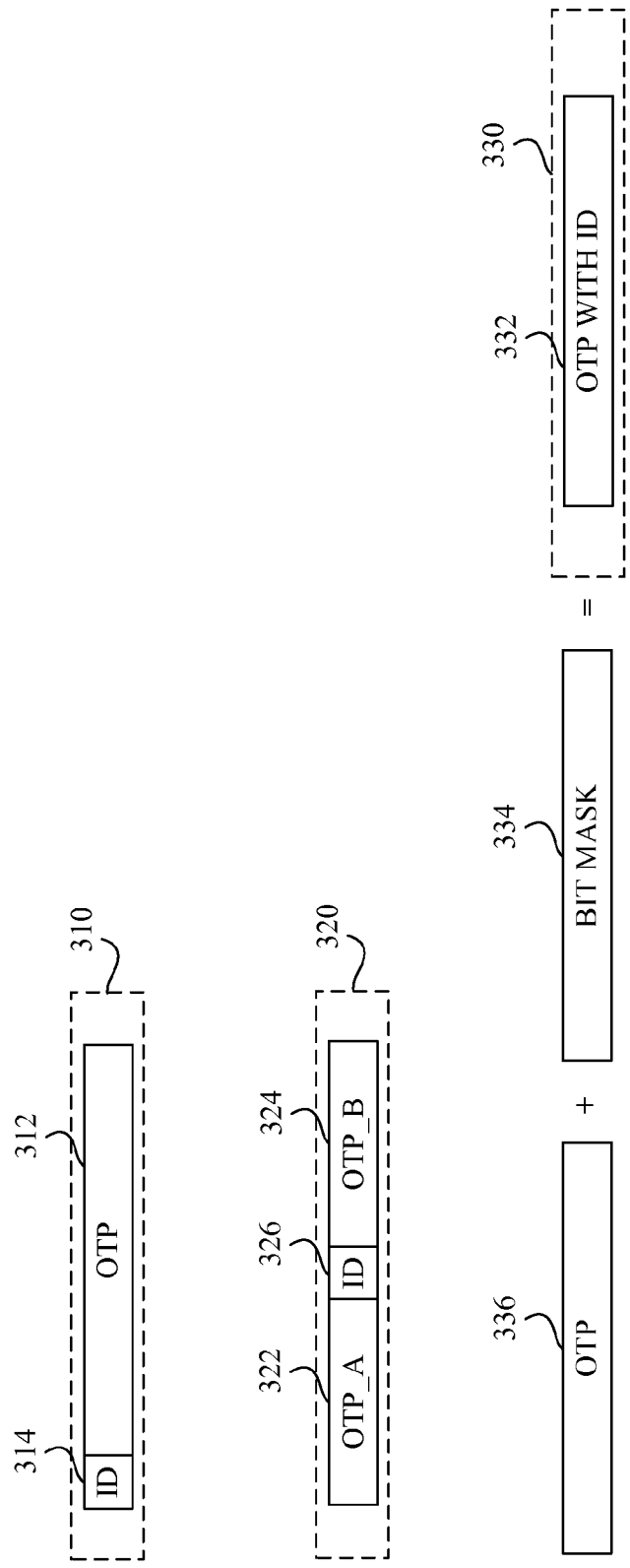
FIG. 3 shows OTP information including an OTP and an OTP identifier according to various embodiments.

Turning briefly to FIG. 3, FIG. 3 shows OTP information including an OTP and an OTP identifier according to various embodiments. In one embodiment, OTP information 310 includes an OTP 312 with an OTP identifier 314 concatenated thereto. OTP identifier 314 may be concatenated to any suitable portion of OTP 312, such as a beginning of OTP 312 or an end of OTP 312.

In another embodiment, OTP information 320 includes an OTP identifier inserted within the OTP. In this case, the OTP may be separated into two or more portions, such as OTP_A 322 and OTP_B 324, where OTP identifier 326 is disposed therebetween. The OTP may be separated into any suitable number of portions, such as 2, 3, 4 or 5 or more portions, and similarly, OTP identifier 326 may also be separated into multiple portions that are each disposed between portions of the OTP. In some embodiments, identical copies of OTP identifier 326 may be disposed between different portions of the OTP so as to introduce redundancy of the OTP identifier into OTP information 320.

In yet another embodiment, OTP information 330 includes information 332 resulting from the OTP identifier being applied as a bit mask 334 to the OTP 336. In such a case, the OTP identifier may not be immediately apparent from viewing information 332. One skilled in the art would recognize that encoding an OTP identifier into an OTP is not limited to applying the OTP identifier as a bitmask. Rather, various techniques may be used to encode the OTP identifier into OTP 336, and all such techniques are intended to be included in the scope of this application. In some embodiments, each OTP may be associated with OTP parameters, such as an identifier identifying an algorithm used by the OTP generator, identifiers of extension sets, etc. In some cases, the OTP identifier may be included in the OTP parameters, such that communication of the OTP and OTP identifier includes communicating the OTP and OTP parameters.

In some embodiments, OTP information (e.g., OTP information 310, 320, and/or 330) may also include a checksum for detecting errors in the OTP. The checksum may be generated by the user computing device based on the OTP and/or OTP identifier. Like the OTP identifier, the checksum may be added to the OTP using any one or more of a variety of techniques. For example, the checksum may be concatenated to any suitable portion of the OTP or the combined OTP and OTP identifier, such as the beginning or end of the OTP or combined OTP and OTP identifier. For another example, the checksum may be inserted within the OTP or the combined OTP and OTP identifier. For yet another example, the checksum may be applied as a bit mask to the OTP or the combined OTP and OTP identifier.

Returning now to FIG. 2, in operation 250, electronic computing device 110 receives an authentication response 250. The authentication response may be received from any suitable entity, such as authentication server 130 and/or service provider 140. In some cases, electronic computing device 120 may not receive the authentication response, but rather user 120 or another electronic computing device associated with user 120 may receive the authentication response. For example, the authentication response may be in the form of service provider 140 denying user 120 access to the requested goods or services. In some embodiments, the authentication response may be generated based on an authentication of user 120 using both the OTP and OTP identifier communicated in operation 240, and may indicate whether user 120 is authenticated to access the goods or services provided by service provider 140.

It should be appreciated that the specific operations illustrated in FIG. 2 provide a particular method that may be executed by an electronic computing device, according to certain embodiments of the present invention. Other sequences of operations may also be performed according to alternative embodiments. For example, alternative embodiments of the present invention may perform the operations outlined above in a different order. Moreover, the individual operations illustrated in FIG. 2 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 4:
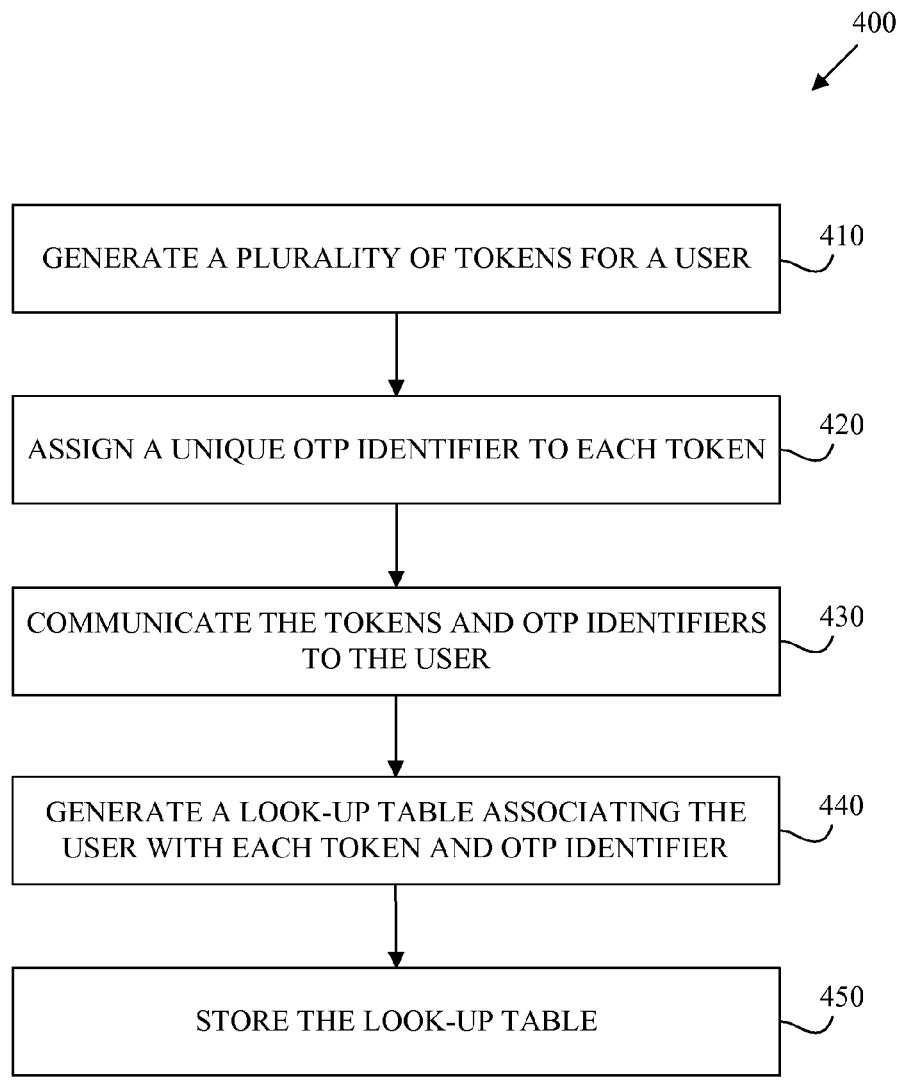
FIG. 4 is a flowchart depicting example operations of an authentication server that may be used to initialize the authentication server for authenticating a user to access goods or services provided by a service provider.

FIG. 4 is a flowchart depicting example operations 400 of authentication server 130 in accordance with an embodiment. The example operations show one or more steps that may be used to initialize authentication server 130 for authenticating a user 120 to access goods or services provided by service provider 140.

In operation 410, authentication server 130 generates a plurality of tokens or other OTP generators for a user. The tokens may be any suitable OTP generator and, as discussed with reference to FIG. 2, may use any suitable techniques and information to generate OTPs. In some embodiments, the tokens or other OTP generators may be provided by service provider 140, while in other embodiments the tokens or other OTP generators may be provided by authentication server 130 and associated with a particular service provider 140. The OTP tokens or other OTP generators may, in some embodiments, be stored in storage element 136.

In operation 420, authentication server 130 assigns a unique OTP identifier to each token or other OTP generator. As discussed with reference to FIG. 2, the OTP identifier may operate to uniquely identify the associated OTP generator from other OTP generators, where all OTP generators may be operable to generate OTPs operable to authenticate user 120 to access goods or services provided by a single service provider such as service provider 140. The OTP identifiers may be stored in storage element 136 and, as discussed with reference to FIG. 2, may take any suitable form for identifying associated OTP generators.

In operation 430, authentication server 130 communicates the tokens and associated identifiers to the user 120. For example, authentication server 130 may communicate the tokens and associated OTP identifiers to electronic computing device 110 associated with user 120 via network 150, communication interface 132, and communication interface 112.

In operation 440, authentication server 130 generates a look-up table associating user 120 with each token and OTP identifier. For example, the look-up table may associate user 120 with each token generated in operation 410 and its unique OTP identifier assigned in operation 420.

Figure 7:
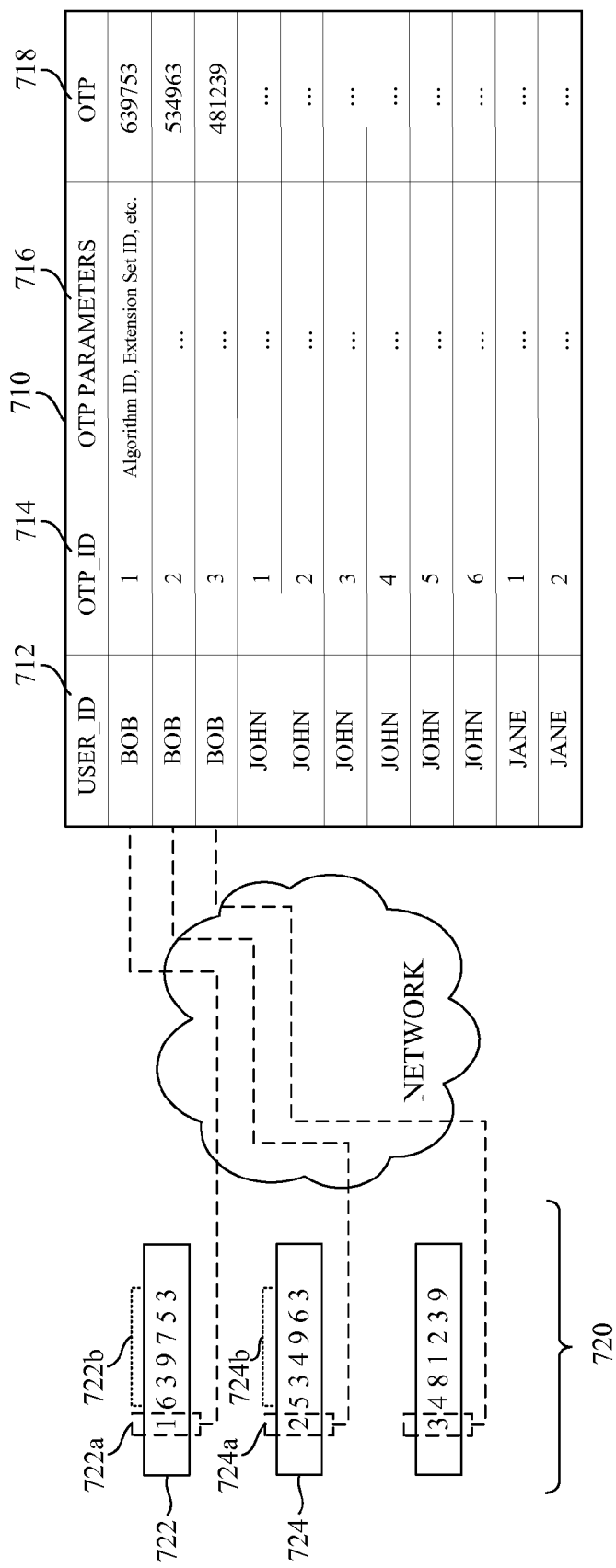
FIG. 7 shows a simplified authentication look-up table provided at an authentication server and numerous instances of OTP information provided by one or more electronic computing devices associated with a user.

Turning briefly to FIG. 7, FIG. 7 shows a simplified authentication look-up table 710 provided at an authentication server 130 and numerous instances of OTP information 720 (e.g., an OTP and an associated OTP identifier) provided by one or more electronic computing devices 110 associated with user 120. Look-up table 710 includes a user identifier column 712 that includes information identifying different users that may be authenticated to access or goods or services from service provider 140. For example, user "BOB" is associated with three different OTPs, user "JOHN" is associated with six different OTPs, and user "JANE" is associated with two different OTPs. While the information in user identifier column 712 is shown as symbols from the alphabet, the information populating user identifier column 712 may include any suitable user identifier such as those discussed with reference to FIG. 2.

Look-up table 710 may also include an OTP identifier column 714 that includes information identifying different OTPs associated with each user. For example, user "BOB" is associated with three different OTP identifiers, "1", "2", and "3", while user "JOHN" is associated with six different OTP identifiers. While the information in OTP identifier column 714 is shown as numbers, the information populating OTP identifier column 714 may include any suitable OTP identifier such as those discussed with reference to FIG. 2.

Look-up table 710 may also include an OTP parameters column 716 that includes information for various parameters associated with each OTP. For example, the OTP parameters may include details used to generate an OTP like an OTP algorithm identifier, an OTP seed, a shared secret, synchronization details (e.g., a counter, time information, etc.), an extension set, etc. In some embodiments, the OTP parameters may also or alternatively include the OTP identifier.

Look-up table 710 may also include an OTP column 718 that includes an OTP that is associated with each OTP identifier for each user, where each OTP in the table is unique. Accordingly, each OTP is one of a plurality of OTPs associated with a user that is operable to authenticate the user to receive goods or services from service provider 140. As discussed with reference to FIG. 2, each OTP may take any suitable form, such as numbers, characters, symbols, or any combination thereof.

On the user side, user 120 may generate one or more of a plurality of OTPs that, if matched with OTPs associated with that user, operate to authenticate the user to access goods or services provided by a service provider. For example, first OTP information 722 may be generated that includes a first OTP identifier 722a and a first OTP 722b, where first OTP identifier 722a, which is "1" in this example, operates to indicate that first OTP 722b, which is "639753" in this example, is a first instance of a number of OTPs associated with "BOB". Authentication server 130 may then determine whether first OTP identifier 722a matches any of the OTP identifiers associated with "BOB". In this example, first OTP identifier 722a matches the stored OTP identifier "1". Subsequently, authentication server 130 may determine whether the first OTP 722b matches the OTP associated with the OTP identifier "1" for user "BOB". In this example, the OTP associated with OTP identifier "1" for user "BOB" is "639753", which matches first OTP 722b. Accordingly, upon authentication server 130 receiving first OTP information 722, authentication server 130 may operate to authenticate user "BOB" to access the goods or services provided by service provider 140. Alternatively, if authentication server 130 received second OTP information 724 including second OTP identifier 724a "2" and second OTP 724b "534963", after matching such information with user identifier "BOB" in table 710, authentication server 130 would similarly operate to authenticate user "BOB" to access the same goods or services that would user "BOB" would have been authenticated to access via use of first OTP information 722.

In some embodiments, the various OTP information at the user side may be generated by multiple different electronic computing devices. For example, first OTP information 722 may be generated by a first electronic computing device, whereas second OTP information 724 may be generated by a second electronic computing device different than the first electronic computing device. In other embodiments, the various OTP information at the user side may be generated by the same electronic computing device, such as electronic computing device 110.

Returning now to FIG. 4, in operation 450, the look-up table generated in operation 440 is stored. For example, authentication server 130 may store look-up table 710 (FIG. 7) in storage element 136.

It should be appreciated that the specific operations illustrated in FIG. 4 provide a particular method that may be executed by an authentication server, according to certain embodiments of the present invention. Other sequences of operations may also be performed according to alternative embodiments. For example, alternative embodiments of the present invention may perform the operations outlined above in a different order. Moreover, the individual operations illustrated in FIG. 4 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 5:
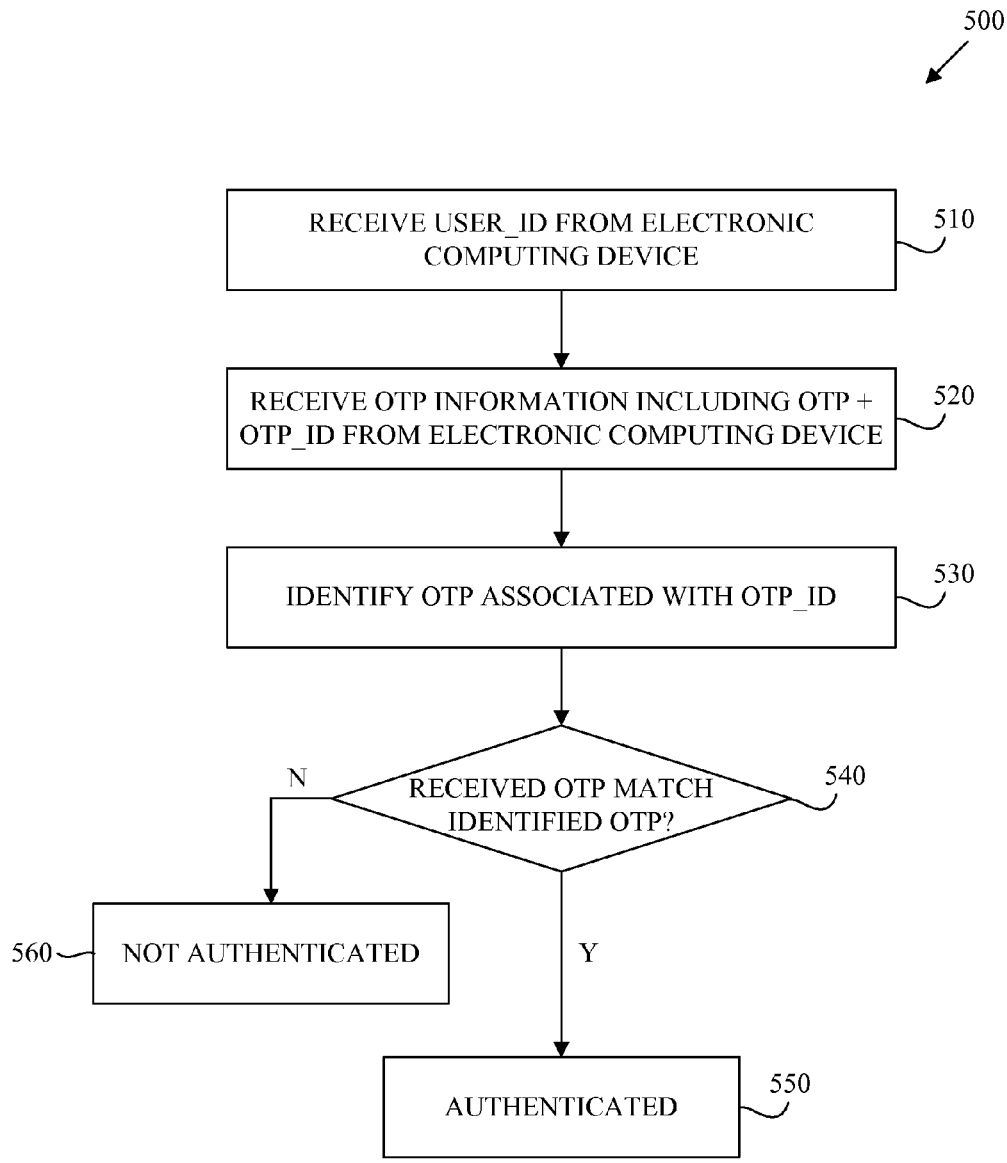
FIG. 5 is a flowchart depicting example operations of an authentication server that may be used to authenticate a user to access goods or services provided by a service provider.

FIG. 5 is a flowchart depicting example operations 500 of authentication server 130 in accordance with an embodiment. The example operations show one or more steps that may be used by authentication server 130 to authenticate a user 120 to access goods or services provided by service provider 140.

In operation 510, authentication server 130 receives a user identifier (user_ID) from electronic computing device 110. For example, authentication server 130 may receive the user identifier communicated from electronic computing device 110 as discussed with reference to operation 230 in FIG. 2. Authentication server 130 may receive the user identifier in any suitable fashion. For example, authentication server 130 may receive the user identifier via network 150 and communication interface 132. In some embodiments, authentication server 130 may store the received user identifier in storage element 136.

In operation 520, authentication server 130 receives OTP information including an OTP and OTP identifier from electronic computing device 110. For example, authentication server 130 may receive the OTP information communicated from electronic computing device 110 as discussed with reference to operation 240 in FIG. 2. Authentication server 130 may receive the OTP information in any suitable fashion. For example, authentication server 130 may receive the OTP information via network 150 and communication interface 132. In some embodiments, authentication server 130 may store the received OTP information in storage element 136.

In operation 530, authentication server 130 identifies a stored OTP associated with the received OTP identifier. For example, authentication server 130 may receive from an electronic computing device associated with "BOB" OTP information including OTP identifier "2". With reference to FIG. 7, authentication server 130 may identify OTP "534963" which is associated with the received OTP identifier "2" and "BOB". In some embodiments, the stored OTP may be static, whereas in other embodiments the stored OTP may be dynamically generated (e.g., the stored OTP may be generated for each authentication request received from the user).

Returning to FIG. 5, in operation 540, authentication server 130 determines whether the received OTP matches the identified OTP. For example, with reference again to FIG. 7, authentication server 130 may determine whether the received OTP, e.g., "534963", matches the identified OTP, which in this example is "534963". In some embodiments, the received OTP must be identical to the identified OTP, whereas in other embodiments, the received OTP may be substantially identical to the identified OTP.

If authentication server 130 determines that the received OTP matches the identified OTP, such as in the example discussed above with reference to received OTP information "2534963", processing may continue to operation 550, where authentication server 130 authenticates the user associated with the received OTP information. Following the example discussed above, authentication server 130 would authenticate the user associated with the user identifier "BOB". If, on the other hand, authentication server 130 determines that the received OTP does not match the identified OTP, processing may continue to operation 560, where authentication server 130 does not authenticate the user.

In authenticating the user, authentication server 130 may enable user 120 to access goods or services provided by a single service provider such as service provider 140. In some embodiments, authentication server 130 may be part of service provider 140, in which case service provider 140 may operate to authenticate user 120 via its authentication server. In other embodiments, authentication server 130 may be external to and/or a separate entity from service provider 140. In such a case, authentication server 130 may communicate information to service provider 140 indicating whether user 120 is authenticated.

In some embodiments, authentication server 130 may also perform an operation of detecting errors in the received OTP and/or OTP identifier. For example, in cases where the received OTP information includes a checksum, authentication server 130 may read the checksum and use the checksum to determine whether any errors exist in the received OTP and/or OTP identifier. If authentication server 130 detects on or more errors, processing may continue to operation 560 where the user is not authenticated. In some embodiments, authentication server 130 may communicate a message to the user or electronic computing device associated with the user indicating that one or more errors were detected in the received OTP information.

It should be appreciated that the specific operations illustrated in FIG. 5 provide a particular method that may be executed by an authentication server, according to certain embodiments of the present invention. Other sequences of operations may also be performed according to alternative embodiments. For example, alternative embodiments of the present invention may perform the operations outlined above in a different order. Moreover, the individual operations illustrated in FIG. 5 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 6:
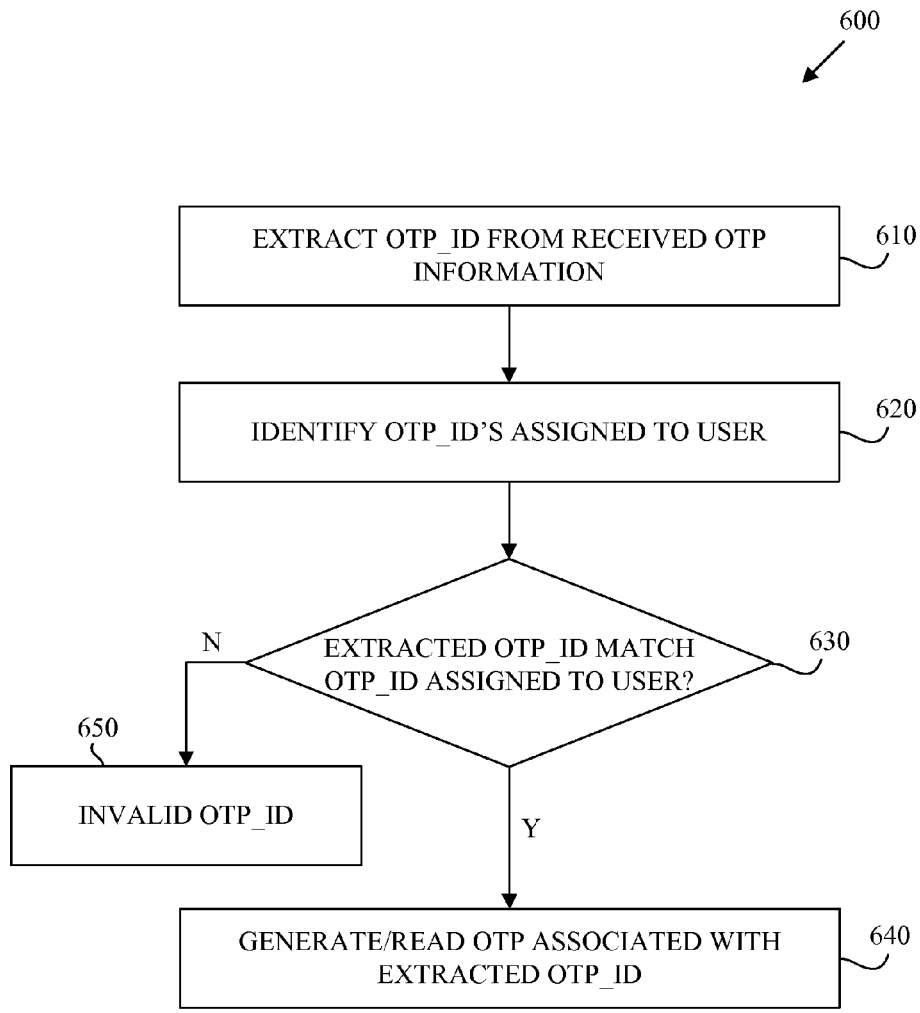
FIG. 6 is a flowchart depicting example operations of an authentication server that may be used to identify a stored OTP associated with a received OTP identifier.

FIG. 6 is a flowchart depicting example operations 600 of authentication server 130 in accordance with an embodiment. The example operations show one or more steps that may be used by authentication server 130 to identify a stored OTP associated with a received OTP identifier. For example, the example operations show one or more steps that may be used by authentication server 130 to perform operation 530 as discussed with reference to FIG. 5.

In operation 610, authentication server 130 extracts an OTP identifier from received OTP information. For example, authentication server 130 may receive OTP information including an OTP identifier and an OTP as discussed with reference to operation 520 in FIG. 5. The OTP information may assume any one or more of a number of forms such as those discussed with reference to FIG. 3. Authentication server 130 may operate to extract the OTP identifier from the received OTP information in any suitable fashion based on the form of the received OTP information. For example, where an OTP identifier is concatenated to an OTP and/or inserted within an OTP, authentication server 130 may read the information at the beginning, end, and/or middle of the OTP information in order to obtain the OTP identifier. For another example, where an OTP identifier is applied as a bit mask to the OTP, authentication server 130 may perform a reverse operation such as a reverse bit mask on the received OTP information to extract the OTP identifier. In some embodiments, authentication server 130 may store the extracted OTP identifier in storage element 136.

In operation 620, authentication server 130 identifies OTP identifiers that are assigned to the user associated with the received OTP information. Authentication server 130 may identify OTP identifiers using any one or more of a number of techniques. In one embodiment, authentication server 130 may receive the user identifier from electronic computing device 120 as discussed in operation 510 with reference to FIG. 5. Authentication server may then read look-up table 710 (FIG. 7) and compare the received user identifier with user identifiers included in user identifier column 712. For each match, authentication server 130 may read the associated OTP identifier from table 710. For example, where the received user identifier is "BOB", authentication server may match the received user identifier with three entries in look-up table 710, and read the corresponding OTP identifiers "1", "2", and "3".

In another embodiment, authentication server 130 may receive information indicative of a user identifier without actually receiving the user identifier. For example, electronic computing device 110 may communicate a device identifier that uniquely identifies that device to authentication server 130, such as a MAC address, IP address, and/or other information uniquely identifying electronic computing device 110. Authentication server 130 may have stored in storage element 136 information associating device identifiers with user identifiers and, upon receiving the device identifier, determine the corresponding user identifier and subsequently the OTP identifiers assigned for that user identifier. In some cases, authentication server 136 may not have or use user identifiers, but rather map device identifiers to OTP identifiers and OTPs.

In operation 630, authentication server 130 determines whether the extracted OTP identifier matches an OTP identifier assigned to the user. For example, with reference to FIG. 7, upon extracting OTP identifier "2" from received OTP information 724, and upon identifying OTP identifiers "1", "2", and "3" that are associated with the received user identifier "BOB", authentication server 130 may compare extracted OTP identifier "2" to assigned OTP identifiers "1", "2", and "3" to determine whether there is a match.

If authentication server 130 determines that the extracted OTP identifier matches one of the OTP identifiers assigned to the user, processing may continue with operation 640 where authentication server 130 generates or reads the OTP associated with the extracted OTP identifier. In one embodiment, where authentication server 130 pre-generates the OTPs and, for example, stores them in a table such as look-up table 710, authentication server 130 may read the OTP pre-stored in the table. For example, continuing with the above example, upon determining that received OTP identifier "2" matches stored OTP "2" assigned to user identifier "BOB", authentication server will read OTP "534963" that is associated with OTP identifier "2" and "BOB". In another embodiment, where authentication server 130 does not pre-generate the OTPs, authentication server 130 may generate the OTP upon receiving the OTP identifier. For example, authentication server 130 may associate a unique OTP generator with each user and OTP identifier, such as user "BOB" and OTP identifier "2". Authentication server 130 may then use the unique OTP generator to generate OTP "534963". For yet another example, authentication server 130 may read OTP parameters that are pre-stored in storage element 136 and associated with each user and OTP identifier, and/or OTP parameters that are received with OTP information, and use the OTP parameters together with an OTP generator to generate OTP "534963".

On the other hand, if authentication server 130 determines that the extracted OTP identifier does not match one of the OTP identifiers assigned to the user, processing may continue with operation 650, where authentication server 130 determines that the received OTP identifier is invalid. In such a case, authentication server 130 may determine that the user is not authenticated such as is described in operation 560 with reference to FIG. 5.

It should be appreciated that the specific operations illustrated in FIG. 6 provide a particular method that may be executed by an authentication server, according to certain embodiments of the present invention. Other sequences of operations may also be performed according to alternative embodiments. For example, alternative embodiments of the present invention may perform the operations outlined above in a different order. Moreover, the individual operations illustrated in FIG. 6 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 8:
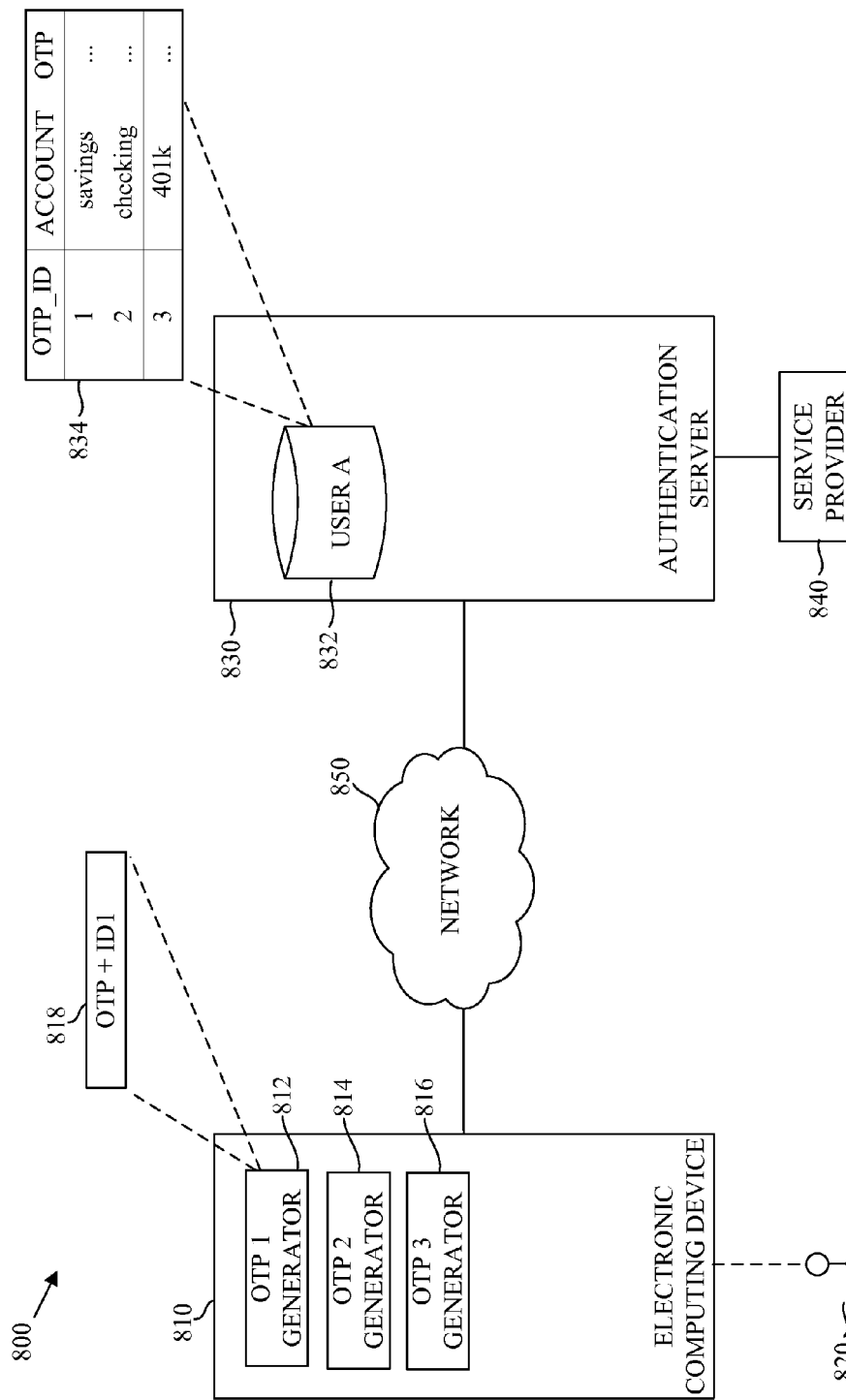
FIG. 8 shows a simplified system operable to implement OTP authentication in accordance with a first embodiment.

FIG. 8 shows a simplified system 800 operable to implement OTP authentication in accordance with a first embodiment. System 800 includes an electronic computing device 810 associated with a user 820, and an authentication server 830 associated with a service provider 840, all interconnected via a network 850. The components of system 800 (e.g., electronic computing device 810) are similar to those discussed with reference to system 100 of FIG. 1 (e.g., electronic computing device 110), and each component may include some or all of the elements (e.g., user interface 118) of the components discussed with reference to FIG. 1. Accordingly, further discussion of those elements is omitted.

In accordance with this embodiment, OTP authentication may be implemented such that a single user, user 820, may access multiple accounts provided by a single service provider, service provider 840. For example, service provider 840 may be a bank that operates various accounts for user 820 (User A), such as a savings account, a checking account, a 401k account, etc. User 820, using a single electronic computing device 810 (or in some embodiments could use multiple electronic computing devices 810), may access each account provided by service provider 840, where authentication of the user to access each account is performed using a unique OTP.

Electronic computing device 810 may have multiple OTP generators, for example a first OTP generator 812, second OTP generator 814, and third OTP generator 816. Each OTP generator may be a token and include hardware and/or software operable to generate a unique OTP using time synchronization, counter synchronization, or other suitable synchronization techniques. Each OTP generator is operable to generate OTP information, and may be provided by authentication server 830 and/or service provider 840 such that authentication server 830 may also include, for each user, multiple OTP generators that are each independently synchronized with a corresponding OTP generator of electronic computing device 810.

Authentication server 830 may include storage elements, such as storage element 832, associated with each user which authentication server 830 is operable to authenticate. In some cases, authentication server 830 may include one storage element that stores information for multiple users via, e.g., tables such as that discussed with reference to FIG. 7. In the embodiment depicted in FIG. 8, storage element 832 is associated with User A, and includes a look-up table 834 stored therein that is similar to look-up table 710 (FIG. 7), where the look-up table and/or elements of the look-up table (such as the OTP) may be static or dynamically generated as previously discussed. However, in this case, each OTP identifier is associated with a particular account accessible by User A, such as a savings account, a checking account, and a 401k account.

In operation, electronic computing device 820 may communicate a user identifier and OTP information to authentication server 830 similar to that discussed with reference to FIG. 2. However, in this case, the OTP generated and OTP information communicated may be dependent on the type of account which user 820 is attempting to access. For example, where user 820 desires to access their savings account, user 820 may operate electronic computing device 810 to generate an OTP and OTP identifier via OTP 1 generator 812. OTP information 818 may thus include OTP identifier "1" and the OTP associated with identifier "1".

Upon receiving OTP information 818 and a user identifier, device identifier, or the like, authentication server 830 may read look-up table 834 that is associated with the received user identifier/device identifier/etc. When user 820 attempts to access an account, authentication server 830 will determine whether the received OTP matches the OTP associated with the selected account. For example, where user 820 desires to access their savings account, authentication server 830 will determine whether the received OTP matches the OTP associated with OTP identifier "1".

One of ordinary skill in the art would recognize that the operations of electronic computing device 810 and authentication server 830 discussed in accordance with this embodiment may include one or more of the operations discussed with reference to FIGS. 2 to 7, although in this case customized to a user accessing multiple accounts for which access is controlled by authentication server 830. Further, one of ordinary skill in the art would recognize that the OTP generators discussed with reference to electronic computing device 810 may be provided in one or more electronic computing devices. For example, each OTP generator may be provided in a single electronic computing device.

Figure 9:
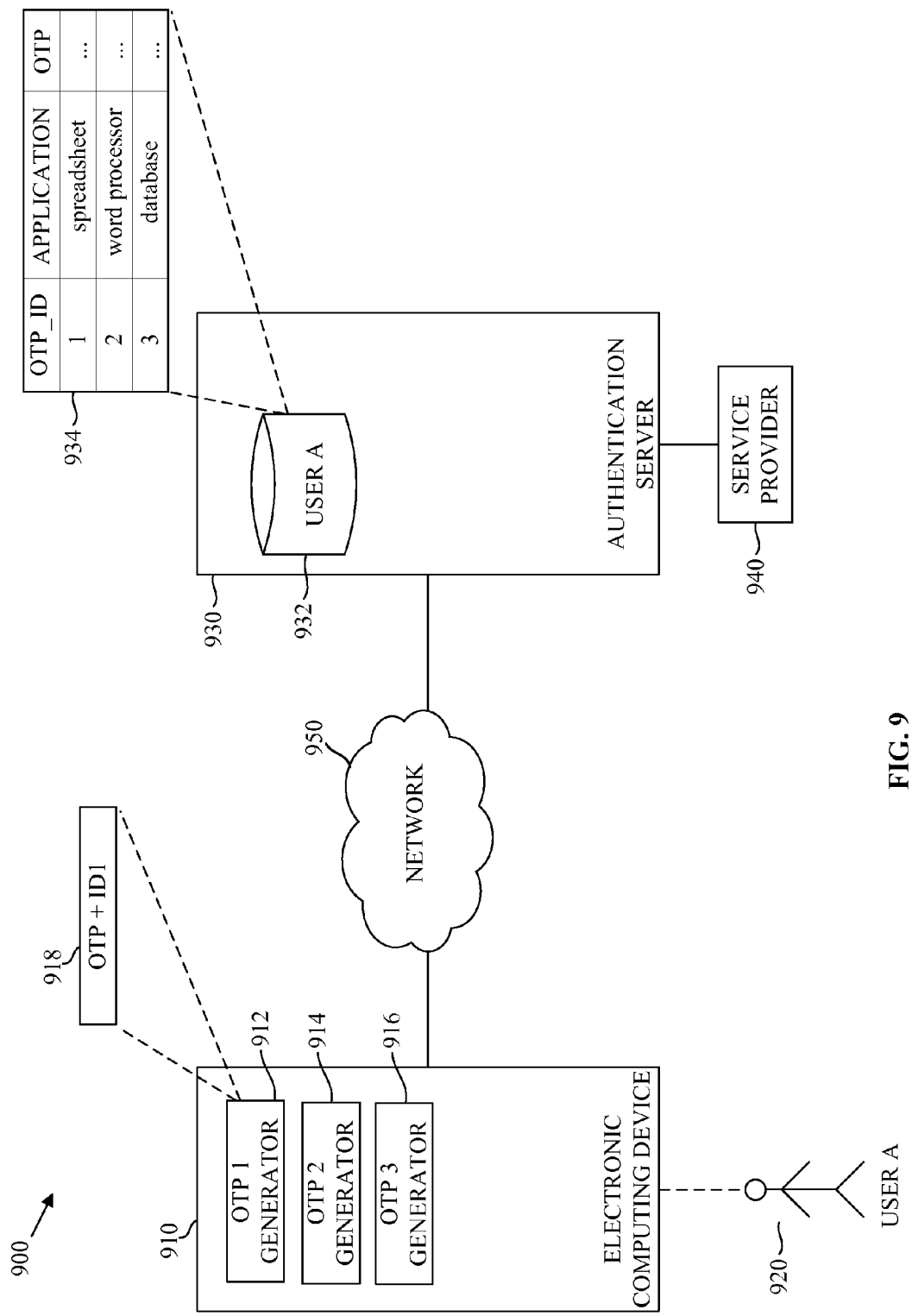
FIG. 9 shows a simplified system operable to implement OTP authentication in accordance with a second embodiment.

FIG. 9 shows a simplified system 900 operable to implement OTP authentication in accordance with a second embodiment. System 900 includes an electronic computing device 910 associated with a user 920, and an authentication server 930 associated with a service provider 940, all interconnected via a network 950. The components of system 900 (e.g., electronic computing device 910) are similar to those discussed with reference to system 100 of FIG. 1 (e.g., electronic computing device 110), and each component may include some or all of the elements (e.g., user interface 118) of the components discussed with reference to FIG. 1. Accordingly, further discussion of those elements is omitted.

In accordance with this embodiment, OTP authentication may be implemented such that a single user, user 920, may access multiple applications provided by a single service provider, service provider 940. For example, service provider 940 may be a software as a service (Saas) vendor that provides user 920 ("User A") with access to various software applications such as a spreadsheet application, a word processing application, a database application, etc. User 920, using a single electronic computing device 910 (or in some embodiments could use multiple electronic computing devices 910), may access each application provided by service provider 940, where authentication of the user to access each account is performed using a unique OTP.

Electronic computing device 910 may have multiple OTP generators, for example a first OTP generator 912, second OTP generator 914, and third OTP generator 916. Each OTP generator may be a token and include hardware and/or software operable to generate a unique OTP using time synchronization, counter synchronization, or other suitable synchronization techniques. Each OTP generator is operable to generate OTP information, and may be provided by authentication server 930 and/or service provider 940.

Authentication server 930 may include storage elements, such as storage element 932, associated with each user which authentication server 930 is operable to authenticate. In some cases, authentication server 930 may include one storage element that stores information for multiple users via, e.g., tables such as that discussed with reference to FIG. 7. In the embodiment depicted in FIG. 9, storage element 932 is associated with User A, and includes a look-up table 934 stored therein that is similar to look-up table 710 (FIG. 7), where the look-up table and/or elements of the look-up table (such as the OTP) may be static or dynamically generated as previously discussed. However, in this case, each OTP identifier is associated with a particular application accessible by User A, such as a spreadsheet, word processor, and database.

In operation, electronic computing device 920 may communicate a user identifier and OTP information to authentication server 930 similar to that discussed with reference to FIG. 2. However, in this case, the OTP generated and OTP information communicated may be dependent on the type of application which user 920 is attempting to access. For example, where user 920 desires to access the spreadsheet application provided by service provider 940, user 920 may operate electronic computing device 910 to generate an OTP and OTP identifier via OTP 1 generator 912. OTP information 918 may thus include OTP identifier "1" and the OTP associated with identifier "1".

Upon receiving OTP information 918 and a user identifier, device identifier, or the like, authentication server 930 may read look-up table 934 that is associated with the received user identifier/device identifier/etc. When user 920 attempts to access an application, authentication server 930 will determine whether the received OTP matches the OTP associated with the selected application. For example, where user 920 desires to access the spreadsheet application, authentication server 930 will determine whether the received OTP matches the OTP associated with OTP identifier "1".

One of ordinary skill in the art would recognize that the operations of electronic computing device 910 and authentication server 930 discussed in accordance with this embodiment may include one or more of the operations discussed with reference to FIGS. 2 to 7, although in this case customized to a user accessing multiple applications for which access is controlled by authentication server 930. Further, one of ordinary skill in the art would recognize that the OTP generators discussed with reference to electronic computing device 910 may be provided in one or more electronic computing devices. For example, each OTP generator may be provided in a single electronic computing device.

Figure 10:
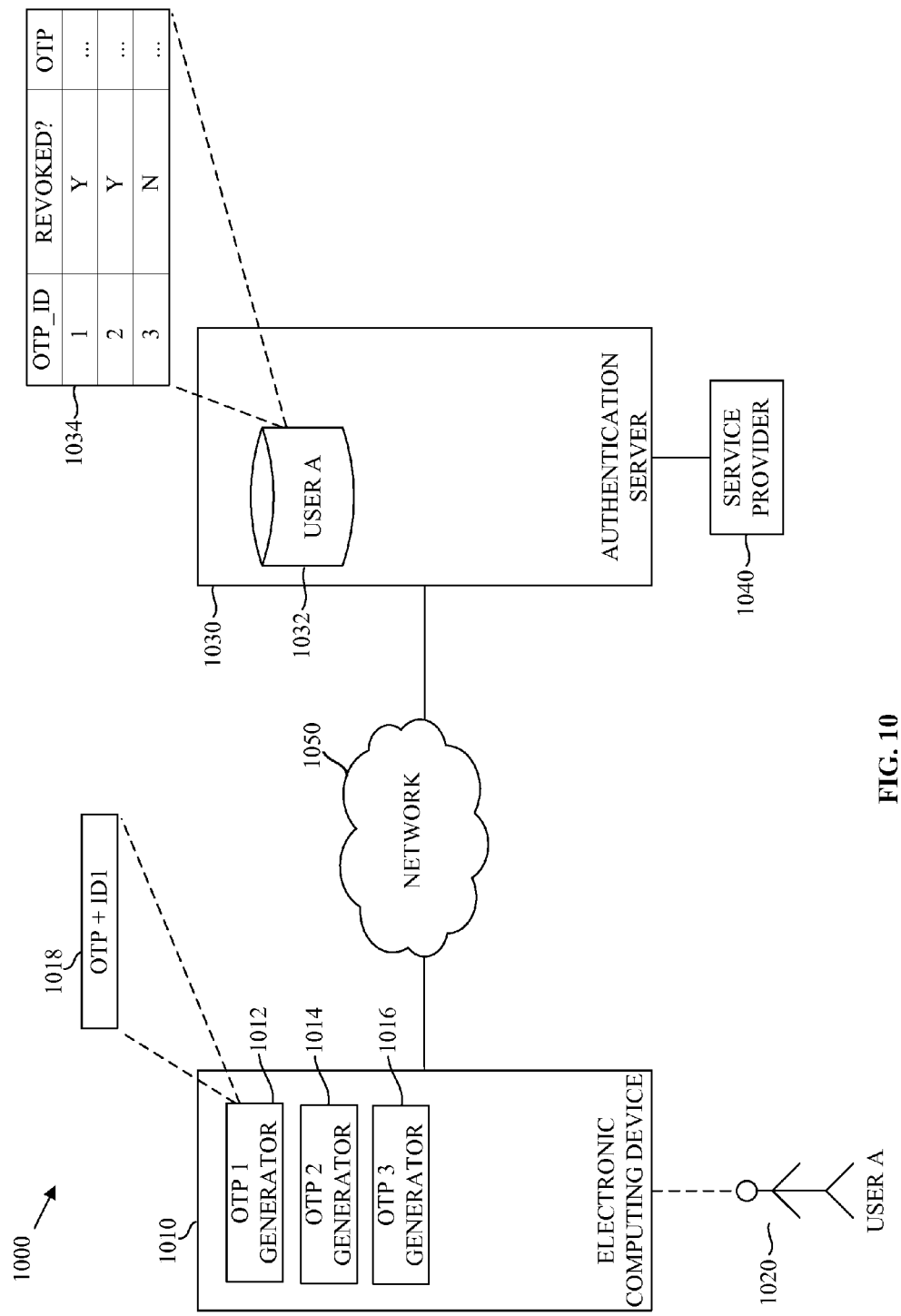
FIG. 10 shows a simplified system operable to implement OTP authentication in accordance with a third embodiment.

FIG. 10 shows a simplified system 1000 operable to implement OTP authentication in accordance with a third embodiment. System 1000 includes an electronic computing device 1010 associated with a user 1020, and an authentication server 1030 associated with a service provider 1040, all interconnected via a network 1050. The components of system 1000 (e.g., electronic computing device 1010) are similar to those discussed with reference to system 100 of FIG. 1 (e.g., electronic computing device 110), and each component may include some or all of the elements (e.g., user interface 118) of the components discussed with reference to FIG. 1. Accordingly, further discussion of those elements is omitted.

In accordance with this embodiment, OTP authentication may be implemented such that a single user, user 1020, may access goods or services provided by a single service provider, service provider 840, where at least one of the OTPs is re-issued. For example, during an authentication attempt, an OTP generated by electronic computing device 1010 and communicated to authentication server 1030 may be revoked by authentication server 1030 for any one or more of a number of reasons, such as where a counter and/or time synchronization between electronic computing device 1010 and authentication server 1030 goes awry, resulting in an otherwise authentic user not being authenticated by authentication server 1030. In such a case, electronic computing device 1010 may generate and communicate another OTP to authentication server 1030 using a different OTP generator, where the second OTP may use a synchronization that is independent of and thus different than that of the first OTP, and thus be operable to appropriately authenticate the user.

Electronic computing device 1010 may have multiple OTP generators, for example a first OTP generator 1012, second OTP generator 1014, and third OTP generator 1016. Each OTP generator may be a token and include hardware and/or software operable to generate a unique OTP using time synchronization, counter synchronization, or other suitable synchronization techniques, where the synchronization elements of OTP generators are independent from one another. Each OTP generator is operable to generate OTP information such as OTP information 1018, and may be provided by authentication server 1030 and/or service provider 1040.

Authentication server 1030 may include storage elements, such as storage element 1032, associated with each user which authentication server 1030 is operable to authenticate. In some cases, authentication server 1030 may include one storage element that stores information for multiple users via, e.g., tables such as that discussed with reference to FIG. 7. In the embodiment depicted in FIG. 10, storage element 1032 is associated with User A, and includes a look-up table 1034 stored therein that is similar to look-up table 710 (FIG. 7), where the look-up table and/or elements of the look-up table (such as the OTP) may be static or dynamically generated as previously discussed. However, in this case, each OTP identifier is associated with revocation information indicating whether the associated OTP has been revoked or otherwise ineffective for authenticating User A.

In operation, electronic computing device 1010 may communicate a user identifier and OTP information 1018 to authentication server 1030 similar to that discussed with reference to FIG. 2. However, in this case, the OTP generated and OTP information 1018 communicated may be dependent on whether a previously generated and communicated OTP authenticates user 1020. For example, electronic computing device 1010 may initially generate and communicate an OTP from OTP 1 generator 1012 to authenticate user 1020. In the event that the OTP from OTP 1 generator 1012 fails to authenticate user 1020, for example if OTP 1 generator 1012 and the corresponding OTP generator in authentication server 1030 become out of sync with each other, electronic computing device 1010 may generate and communicate an OTP from OTP 2 generator 1012 to authenticate user 1020.

In some embodiments, authentication server 1030 may detect that an OTP generator of electronic computing device 1010 and an OTP generator of authentication server 1030 are out of sync with one another. For example, authentication server 1030 may detect such a situation when an OTP stored in look-up table 1034 does not match a received OTP for corresponding OTP identifiers. In such a case, authentication server 1030 may store information indicating that the OTP associated with the received OTP identifier is revoked, and may send information to electronic computing device 1010 indicating that the OTP associated with the received OTP identifier is revoked, or that user 1020 is otherwise not authenticated. Upon receiving such information, electronic computing device 1010 may then generate and send OTP information including a different OTP identifier and OTP.

One of ordinary skill in the art would recognize that the operations of electronic computing device 1010 and authentication server 1030 discussed in accordance with this embodiment may include one or more of the operations discussed with reference to FIGS. 2 to 7, although in this case customized to a user generating and communicating different OTPs in the event one or more OTPs is revoked for access to goods or services provided by a single service provider 1040. Further, one of ordinary skill in the art would recognize that the OTP generators discussed with reference to electronic computing device 1010 may be provided in one or more electronic computing devices. For example, each OTP generator may be provided in a single electronic computing device.

Figure 11:
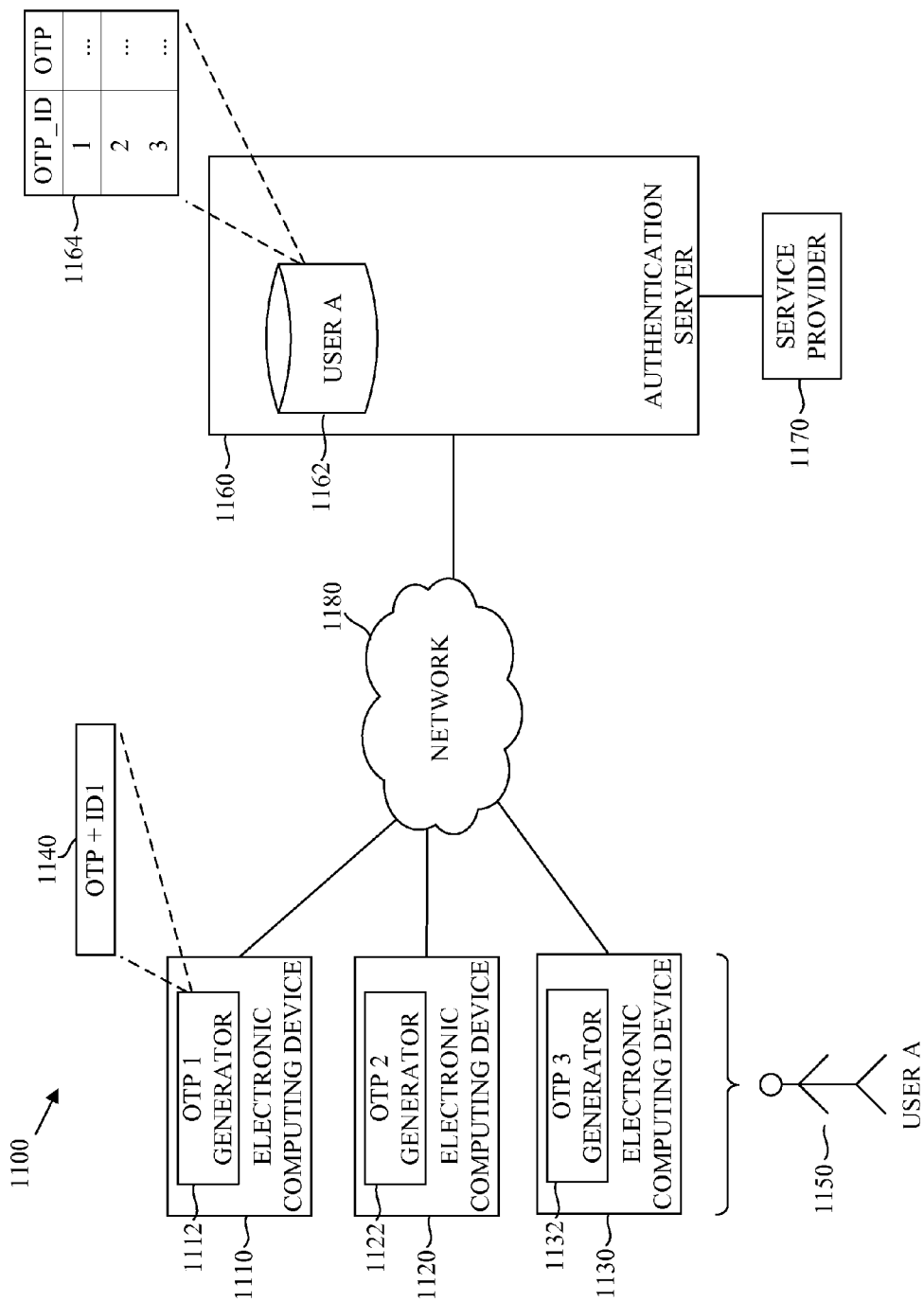
FIG. 11 shows a simplified system operable to implement OTP authentication in accordance with a fourth embodiment.

FIG. 11 shows a simplified system 1100 operable to implement OTP authentication in accordance with a fourth embodiment. System 1100 includes a plurality of electronic computing devices, such as first electronic computing device 1110, second electronic computing device 1120, and third electronic computing device 1130, all associated with a user 1150, and an authentication server 1160 associated with a service provider 1170, all interconnected via a network 1180. In some embodiments, one or more of the electronic computing devices may be un-trusted devices, such as devices which are not owned by the user and/or devices for which access is publicly available. The components of system 1100 (e.g., electronic computing device 1110) are similar to those discussed with reference to system 100 of FIG. 1 (e.g., electronic computing device 110), and each component may include some or all of the elements (e.g., user interface 118) of the components discussed with reference to FIG. 1. Accordingly, further discussion of those elements is omitted.

In accordance with this embodiment, OTP authentication may be implemented such that a single user, user 1150, may use a plurality of electronic computing devices to access goods or services provided by a single service provider, service provider 1170. For example, first electronic computing device 1110 may be a desktop computer, second electronic computing device 1120 may be a cellular phone, and third electronic computing device 1130 may be a netbook, where user 1150 may wish to use any of these electronic computing devices to generate a device-specific OTP for accessing one or more accounts or applications provided by service provider 1170.

In this embodiment, each electronic computing device includes an OTP generator operable to generate a device-specific OTP, where the OTP identifier uniquely identifies the device-specific OTP and is operable to authenticate the user to access goods or services provided by service provider 1170. For example, first electronic computing device 1110 includes OTP 1 generator 1112, second electronic computing device 1120 includes OTP 2 generator 1122, and third electronic computing device 1130 includes OTP 3 generator 1132. Each OTP generator may be a token and include hardware and/or software operable to generate a unique OTP using time synchronization, counter synchronization, or other suitable synchronization techniques. Each OTP generator is operable to generate OTP information, and may be provided by authentication server 1160 and/or service provider 1170. In some embodiments, each electronic computing device may include more than one OTP generator, for example as discussed with reference to FIG. 10.

Authentication server 1160 may include storage elements, such as storage element 1162, associated with each user which authentication server 1160 is operable to authenticate. In some cases, authentication server 1160 may include one storage element that stores information for multiple users via, e.g., tables such as that discussed with reference to FIG. 7. In the embodiment depicted in FIG. 11, storage element 1162 is associated with User A, and includes a look-up table 1164 stored therein that is similar to look-up table 710 (FIG. 7), where the look-up table and/or elements of the look-up table (such as the OTP) may be static or dynamically generated as previously discussed. However, in this case, each OTP identifier is associated with an OTP where the corresponding OTPs on the user side may be generated by different electronic computing devices.

In operation, first electronic computing device 1110 may communicate a user identifier and OTP information such as OTP information 1140 to authentication server 1160 similar to that discussed with reference to FIG. 2. In this case, authentication server 1160 may be operable to authenticate user 1150 using first electronic computing device 1110 since authentication server 1160 can match the OTP information generated and communicated from first electronic computing device 1110 with corresponding OTP information stored in storage element 1162. Similarly, user 1150 may use second electronic computing device 1120 to communicate a user identifier and OTP information to authentication server 1160 similar to that discussed with reference to FIG. 2. In this case, authentication server 1160 may similarly be operable to authenticate user 1150 using second electronic computing device 1120 since authentication server 1160 can match the OTP information generated and communicated from second electronic computing device 1120 with corresponding OTP information stored in storage element 1162. Accordingly, authentication server 1160 may authenticate user 1150 to access goods or services provided by a single service provider, service provider 1170, regardless of which electronic computing device user 1150 uses.

One of ordinary skill in the art would recognize that the operations of the electronic computing devices and authentication server 1160 discussed in accordance with this embodiment may include one or more of the operations discussed with reference to FIGS. 2 to 7, although in this case customized to a user accessing one or more accounts from a plurality of electronic computing devices.

Figure 12:
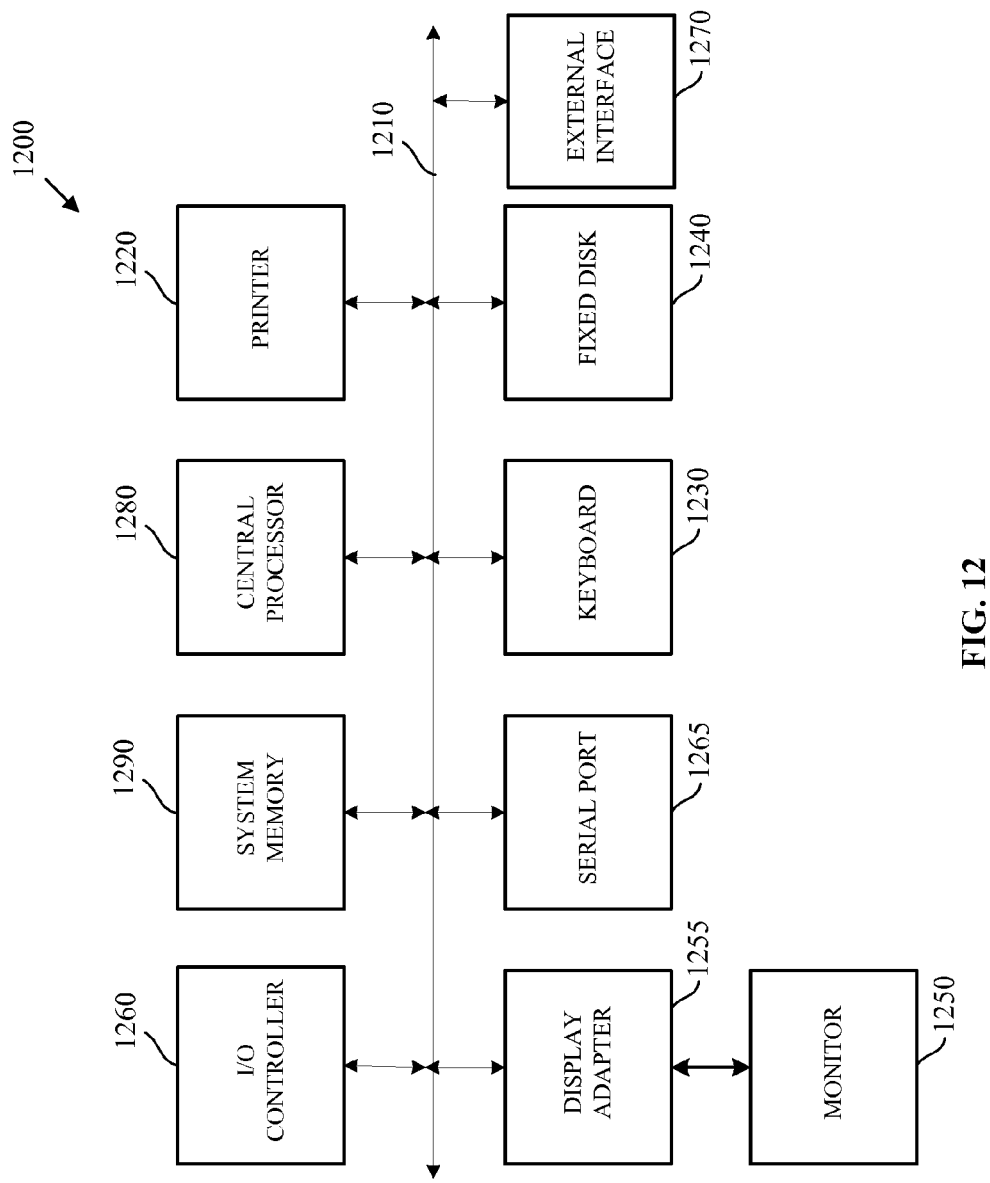
FIG. 12 is a diagram of a computer apparatus according to some embodiments.

FIG. 12 is a diagram of a computer apparatus 1200 according to some embodiments. The various elements in the previously described system diagrams (e.g., electronic computing device 110, authentication server 130, etc.) may use any suitable number of subsystems in the computer apparatus to facilitate the functions described herein. Examples of such subsystems or components are shown in FIG. 12. The subsystems shown in FIG. 12 are interconnected via a system bus 1210. Additional subsystems such as a printer 1220, keyboard 1230, fixed disk 1240 (or other memory comprising tangible, non-transitory computer-readable media), monitor 1250, which is coupled to display adapter 1255, and others are shown. Peripherals and input/output (I/O) devices (not shown), which couple to I/O controller 1260, can be connected to the computer system by any number of means known in the art, such as serial port 1265. For example, serial port 1265 or external interface 1270 can be used to connect the computer apparatus to a wide area network such as the Internet, a mouse input device, or a scanner. The interconnection via system bus allows the central processor 1280 to communicate with each subsystem and to control the execution of instructions from system memory 1290 or the fixed disk 1240, as well as the exchange of information between subsystems. The system memory 1290 and/or the fixed disk 1240 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

What is claimed is:

1. A method for authenticating a user of an electronic computing device using a one-time password (OTP), comprising:
   generating, at the electronic computing device, one of a plurality of OTPs associated with the user and operable to authenticate the user to access goods or services provided by a single service provider;
   sending OTP information comprising the generated OTP and an OTP identifier to an authentication server that is associated with the service provider, the OTP identifier uniquely identifying the generated OTP from other OTPs of the plurality of OTPs; and
   receiving an authentication response from the authentication server, the authentication response being based on an authentication of the user using both the generated OTP and the OTP identifier and indicating whether the user is authenticated to access the goods or services provided by the service provider.

2. The method of claim 1, further comprising:
   sending a user identifier uniquely identifying the user from a plurality of users to the authentication server, wherein the authentication response is further based on the user identifier.

3. The method of claim 1, wherein:
   the user is associated with a plurality of electronic computing devices;
   each electronic computing device of the plurality of electronic computing devices comprises an OTP generator operable to generate a device-specific OTP;
   the OTP identifier uniquely identifies one device-specific OTP of the device-specific OTPs; and
   the device-specific OTPs are operable to authenticate the user to access goods or services provided by a single service provider.

4. The method of claim 1, wherein sending the generated OTP and an OTP identifier comprises concatenating the OTP identifier to the OTP.

5. The method of claim 1, wherein sending the generated OTP and an OTP identifier comprises applying the OTP identifier as a bitmask to the OTP.

6. The method of claim 1, wherein sending the generated OTP and an OTP identifier comprises inserting the OTP identifier within the OTP.

7. The method of claim 1 further comprising communicating a string of OTP parameters associated with the OTP to the authentication server, wherein the string of OTP parameters comprises the OTP identifier.

8. The method of claim 1, wherein generating the OTP comprises generating the OTP concatenated with the OTP identifier, and the method further comprises displaying the concatenated OTP and OTP identifier to the user.

9. The method of claim 1, wherein the authentication response is received at the electronic computing device or at another computing device.

10. An electronic computing device for authenticating a user using a one-time password (OTP), comprising:
    a one-time password generator configured to generate one of a plurality of OTPs, the OTPs being associated with the user and operable to authenticate the user to access goods or services provided by a single service provider;
    a communication interface coupled to the one-time password generator, the communication interface being configured to send OTP information comprising the generated OTP and an OTP identifier to an authentication server that is associated with the service provider, the OTP identifier uniquely identifying the generated OTP from other OTPs of the plurality of OTPs.

11. The electronic device of claim 10, wherein the communication interface is further configured to send a user identifier uniquely identifying the user from a plurality of users to the authentication server, wherein an authentication response from the authentication server is based on the user identifier.

12. The electronic device of claim 10, further comprising:
    a second one-time password generator configured to generate a second one of the plurality of OTPs.

13. The electronic device of claim 12, wherein the communication interface is further configured to send the second one of the plurality of OTPs and a second OTP identifier to the authentication server, the second OTP identifier uniquely identifying the second OTP from other OTPs of the plurality of OTPs.

14. The electronic device of claim 13, wherein the second OTP and the second OTP identifier are sent when an authentication response from the authentication server indicates that the OTP sent earlier to the authentication server did not authenticate the user.

15. The electronic device of claim 10, further comprising:
    a display coupled to the one-time password generator, the display being configured to display the OTP and the OTP identifier to the user.

16. A method for authenticating a user of an electronic computing device using a one-time password (OTP), comprising:
    receiving, at an authentication server, OTP information comprising an OTP and an OTP identifier, both the OTP and the OTP being associated with a user;
    identifying an OTP associated with the received OTP identifier, the identified OTP being one of a plurality of OTPs assigned to the user, the plurality of OTPs being operable to authenticate the user to access goods or services provided by a single service provider associated with the authentication server;
    determining whether the identified OTP matches the received OTP; and
    authenticating the user based on whether or not the identified OTP matches the received OTP.

17. The method of claim 16, further comprising:
    receiving a user identifier identifying the user from a plurality of users, wherein identifying an OTP associated with the OTP identifier comprises identifying a plurality of OTP identifiers associated with the user based on the received user identifier.

18. The method of claim 16, further comprising:
storing, for each of a plurality of users, a plurality of OTP identifiers, each OTP identifier being associated with an OTP which, if matched with an OTP received from the user, is operable to authenticate the user to access goods or services provided by the service provider.

19. The method of claim 16, wherein identifying an OTP associated with the received OTP identifier comprises:
extracting the OTP identifier from the received OTP information;
identifying OTP identifiers associated with the user; and
determining whether the extracted OTP identifier matches any of the identified OTP identifiers associated with the user.

20. The method of claim 19, wherein if it is determined that the extracted OTP identifier matches one of the identified OTP identifiers associated with the user, then identifying an OTP further comprises reading a stored OTP associated with the matched one of the identified OTP identifiers.

21. The method of claim 19, wherein if it is determined that the extracted OTP identifier matches one of the identified OTP identifiers associated with the user, then identifying an OTP further comprises generating an OTP using an OTP generator associated with the matched one of the identified OTP identifiers.

22. An authentication server for authenticating a user of an electronic computing device using a one-time password (OTP), comprising:
a communication interface operable to receive OTP information comprising an OTP and an OTP identifier, both the OTP and the OTP identifier being associated with a user; and
a processor coupled to the communication interface, the processor being operable to:
identify a plurality of stored OTP identifiers assigned to the user, each OTP identifier being associated with an OTP, the plurality of OTPs being operable to authenticate the user to access goods or services provided by a single service provider associated with the authentication server;
determine whether the received OTP identifier matches any of the identified OTP identifiers assigned to the user;
if the received OTP identifier matches one of the identified OTP identifiers assigned to the user, identify the OTP associated with the matched one of the identified OTP identifiers;
determine whether the identified OTP matches the received OTP; and
authenticate the user based on whether or not the identified OTP matches the received OTP.

23. The authentication server of claim 22, wherein the communication interface is further operable to communicate, to the user, information indicating whether or not the user is authenticated.

24. The authentication server of claim 22, wherein the processor is further operable to extract the OTP identifier from the received OTP information.

25. The authentication server of claim 24, wherein extracting the OTP identifier comprises one or more of:
identifying a number, character, or symbol located immediately before or immediately after the OTP;
identifying a number, character, or symbol located at a predetermined position within the OTP;
applying a reverse bitmask to the OTP; and
reading information from OTP parameters included in the OTP information.

* * * * *